United States Patent
Karlsson et al.

(10) Patent No.: US 7,327,901 B2
(45) Date of Patent: Feb. 5, 2008

(54) METHOD IN MICROSCOPY AND A MICROSCOPE, WHERE SUBIMAGES ARE RECORDED AND PUZZLED IN THE SAME COORDINATE SYSTEM TO ENABLE A PRECISE POSITIONING OF THE MICROSCOPE STAGE

(75) Inventors: Adam Karlsson, Lund (SE); Erik Linderup, Bjärred (SE)

(73) Assignee: Cellavision AB, Lund (SE)

( * ) Notice: Subject to any disclaimer, the term of this patent is extended or adjusted under 35 U.S.C. 154(b) by 807 days.

(21) Appl. No.: 10/474,326

(22) PCT Filed: Apr. 12, 2002

(86) PCT No.: PCT/SE02/00719

§ 371 (c)(1),
(2), (4) Date: Oct. 8, 2003

(87) PCT Pub. No.: WO02/084368

PCT Pub. Date: Oct. 24, 2002

(65) Prior Publication Data

US 2004/0114218 A1 Jun. 17, 2004

Related U.S. Application Data

(60) Provisional application No. 60/286,792, filed on Apr. 26, 2001.

(30) Foreign Application Priority Data

Apr. 12, 2001 (SE) .................................. 0101319

(51) Int. Cl.
*G06K 9/32* (2006.01)

(52) U.S. Cl. ...................................... 382/294; 382/128
(58) Field of Classification Search ........ 382/128–134, 382/149, 255, 294, 305, 312; 714/738; 250/201.3; 359/368, 391
See application file for complete search history.

(56) References Cited

U.S. PATENT DOCUMENTS

| 4,513,438 | A | | 4/1985 | Graham et al. |
| 5,633,491 | A | * | 5/1997 | Kasdan ................ 250/201.3 |
| 5,655,029 | A | | 8/1997 | Rutenberg et al. |
| 5,659,489 | A | | 8/1997 | Baldur |
| 5,790,710 | A | * | 8/1998 | Price et al. ............... 382/255 |
| 6,169,816 | B1 | * | 1/2001 | Ravkin ..................... 382/128 |
| 6,546,513 | B1 | * | 4/2003 | Wilcox et al. ........... 714/738 |
| 6,643,394 | B1 | * | 11/2003 | Kuwabara ................. 382/149 |

FOREIGN PATENT DOCUMENTS

| EP | 0 731 371 | 9/1996 |
| EP | 1 024 656 | 8/2000 |
| WO | WO 99/31622 | 6/1999 |

\* cited by examiner

*Primary Examiner*—Kanjibhai Patel
(74) *Attorney, Agent, or Firm*—Buchanan Ingersoll & Rooney PC

(57) ABSTRACT

In a microscope, a position signal is generated in the form of coordinates in a pixel coordinate system by registering microscope images with partly overlapping contents. The position signal can be used to indicate the position of a partial object which has been identified in one of the microscope images. It can also be used to control the displacement of the microscope stage of the microscope, in which case it is possible to use a simple inaccurate drive mechanism for the microscope stage, without necessitating installation of position sensors.

25 Claims, 5 Drawing Sheets

Prior Art

METHOD IN MICROSCOPY AND A MICROSCOPE, WHERE SUBIMAGES ARE RECORDED AND PUZZLED IN THE SAME COORDINATE SYSTEM TO ENABLE A PRECISE POSITIONING OF THE MICROSCOPE STAGE

This is a national phase filing under 35 U.S.C. § 371 of International Application No. PCT/SE02/00719, filed Apr. 12, 2002, that designates the United States of America. The benefit is claimed under 35 U.S.C. § 119(a)-(d) of Swedish Application No. 0101319-2, filed Apr. 12, 2001, and under 35 U.S.C. § 119(e) of U.S. Provisional Application No. 60/286,792, filed Apr. 26, 2001.

FIELD OF THE INVENTION

The present invention relates to a method in microscopy, a computer program product with program code for implementing the method, and a microscope.

BACKGROUND ART

Computer-aided microscopes have previously been used above all in research activities, but are now being increasingly used in commercial applications. In this connection, it has become interesting to reduce the costs of such microscopes.

FIG. 1 shows schematically an example of how a computer-aided microscope can be composed. The microscope comprises a movable microscope stage 10, on which the object 12 to be microscoped is placed, a drive mechanism 14 for moving the microscope stage, an illumination device 16 for illuminating the object, an objective 18 and an image sensor 20, which records the image of the object generated by the objective. The microscope stage 10 with its drive mechanism 14, the illumination device 16, the objective 18 and the image sensor 20 are all mounted on a microscope stand (not shown). The microscope is also provided with a controlling and analysing computer 22 with, for instance, program modules 24, 26 for analysing images and for controlling the drive mechanism. The microscope may also have other hardware and software components which are normally to be found on a microscope, but these components will not be discussed or shown in the Figure since they are now of no interest to the present invention.

A hardware component which is relatively expensive is the microscope stage with its drive mechanism. The reason for this is that high requirements are placed on the combination of microscope stage and drive mechanism.

First, it should be possible for the drive mechanism to position the object with repeatability. By this is meant that a position that has been reached and noted once should be found a second time at request, in a reliable fashion. The time from the request to the position being found again should be short. The accuracy with which the position is found again is not allowed to be too poor. The accuracy should be at least such that the partial object which is located in the searched position is at least found again in the usable part of the image field of the microscope. By usable part is meant that the current partial object, after one focusing, can be discovered also this second time.

Second, the drive mechanism should be able to move the microscope stage so accurately in two dimensions that the entire object can be scanned without parts thereof being unintentionally missed, but yet with such a small overlap between succeeding images that the scanning can be made rapidly.

If it should be possible to satisfy the above-mentioned requirements as regards the drive mechanism in a system without feedback, it is necessary to use very accurate components without play, such as stepping motors and screws of the type that is used in numerically controlled machine tools. However, such components are quite expensive.

Alternatively, position sensors 25 which detect the position of the microscope stage can be installed, and a feedback control system can be used for the positioning. This is shown schematically in FIG. 1 with dashed lines. The drawback of this is, however, that it will be necessary to install additional components which can break, increase the cost of the microscope and need space.

EP 0 731 371 discloses a system for controlling a microscope stage. A camera records an image of an object on the microscope stage. The microscope image is shown on a display. The user marks an interesting area or an interesting point in the microscope image on the display by means of a pointing device. As this takes place, a computer program enters the current coordinates from the control electronics of the microscope stage. The computer program has been calibrated with information about the image size of the camera. Thus, the computer program can calculate coordinates of the marked area or the marked point. The computer program then directs the microscope stage to these coordinates. However, this requires a repeatable drive mechanism for the microscope stage, which has up to now been provided using expensive screws and stepping motors or position control with extra position sensors.

SUMMARY OF THE INVENTION

An object of the present invention is to provide a solution to the problems described above.

This object is achieved wholly or partly by a method according to claim 1, a microscope according to claim 22 and a computer program product according to claim 24.

According to a first aspect, the invention relates more specifically to a method in microscopy, comprising the steps of recording, by means of an image sensor, a second image which reproduces a second area of an object, comparing image information from the second recorded image with image information from at least one previously recorded first image, which reproduces a first area of the object, which is partly the same as the second area, register the second image with the first image on the basis of the result of the comparison, pixels in the second image being assigned coordinates in a pixel coordinate system, in which pixels in the first image have previously been assigned coordinates, and generating a position signal, which comprises coordinates of a point in the second image.

An advantage of this method is that a position can be determined without necessitating installation of special position sensors. Instead the position can be determined by means of the images which are recorded by the image sensor. The position can thus be obtained in an image coordinate system instead of, as before, in a coordinate system related to the microscope stage and its drive mechanism.

The image information that is compared can be the images in the state as recorded, processed versions of the images, for instance filtered images, or other image information extracted from the images, for instance row and column sums for the images.

The registration of the first and the second image can imply that a composite image is produced, in which case the pixel values in each point in the overlapping area for instance can be set as the average value of the pixel values in each image for this point. The registration, however, need not result in a composite image being produced. It is sufficient for the relative displacement between the images to be determined and stored.

Moreover, the registration need not be made once and for all. It can be adjusted later when additional images are recorded and registered with the previously registered images.

The position signal can be used to indicate various conditions. For instance, it may indicate the relative position of the image sensor and the object when recording the second image. The position signal can then be used as an actual value signal in a feedback control system. This means that less exact and thus less expensive components can be used for the relative displacement of the image sensor and the object. Besides, or alternatively, the position signal can be used to indicate the position of a partial object in the second image, to which one wants to revert later. An advantage of this is that the position can be noted without special position sensors. Depending on the use of the position signal, this can be designated as a first or a second position signal.

The method may comprise that the recording step, the comparing step and the registering step are repeated a desirable number of times with relative displacement of the image sensor and the object between repetitions. When a new image is being recorded, the image information from the preceding image will constitute image information from a previously recorded first image.

The recording step, the comparing step and the registering step can be repeated until a predetermined area of the object has been scanned. The predetermined area can be, for example, the entire object, but it can also be only a part thereof. Alternatively, the above steps can be repeated until a predetermined number of partial objects has been identified.

Alternatively, the recording step, the comparing step and the registering step can be repeated until a predetermined relative position of the image sensor and the object is reached, for instance when one wants to return to a previously identified partial object on the object.

The position signal need not be generated each time the recording step is repeated, but it can also be generated once each time the recording step is carried out. If the position signal is only used to indicate the position of partial objects, it may happen, for instance, that there is no partial object of which the position is to be indicated in one or more of the recorded images. If the position signal is used to indicate the relative position of the image sensor and the object, it may, however, be convenient to generate the position signal for each image.

The position signal can also be used to regulate the relative displacement of the object and the image sensor between repetitions of the recording step, the comparing step and the registering step. Regulating can take place, for example, as a position regulation or a speed regulation, the known interval between two image recordings being used to estimate the actual value of the speed.

It is also possible to use the position signal to correct the relative position of the object and the image sensor. This can be carried out, for example, in an open system without feedback. When a relative displacement of the image sensor and the object has been carried out, the position signal is used to check whether the desired relative position has been reached. If not, the relative position is corrected based on the deviation.

The method may further comprise the steps of, for each recorded second image, looking in the image for partial objects of interest and, when a partial object of interest has been identified, storing the pixel coordinates for a point which is related to the partial object. In this case, the pixel coordinates of the partial object can be said to constitute a second position signal which is generated by the coordinates being determined.

The same basic method involving comparison of images to determine how they overlap each other can thus be used in parallel to control the scanning of an object and to determine the position of interesting partial objects. It may be sufficient to make a single registering step, registering two images, for the position information for on the one hand the relative position of the image sensor and the object and, on the other hand, the position of the partial object to be available. A reason for this is that both positions are obtained on the basis of the pixel coordinates which are assigned to a second image when it is being registered with a previously recorded image. The point which is related to the partial object can be, for instance, the centre of gravity of the partial object or some other point which in a suitable manner defines the position of the partial object. The coordinates of several points can also be recorded, for instance to define the extension of a partial object.

As has been evident from the above, one may want to return to previously stored positions. Therefore the method may comprise the step of controlling the relative displacement of the image sensor and the object to a position which corresponds to the stored pixel coordinates for a point which is related to a first partial object by, starting from a reference position, controlling the displacement on the basis of the pixel coordinates, and by repeating, during the displacement, the recording step, the comparing step, the registering step and the generation of the position signal and by comparing the position signal with the pixel coordinates.

The same method can thus be used both in structured scanning of a predetermined area of an object and when returning to a previously recorded position. However, the same path to the position need not be repeated. The scanning may, for example, take place row by row on the object, but if one is to return to a point in the centre of the object, the relative displacement of the image sensor and the object can, for example, take place along a diagonal so that as few images as possible need be recorded.

The reference point from which one starts can be, for example, a point in the image that is recorded first in the scanning of the object or a point in the image that is recorded last in the scanning, or some other convenient point. This point can thus be an origin of the pixel coordinate system.

If, in microscopy, one is to return sequentially to a plurality of previously stored positions, it is, however, not necessary to return to the origin. Instead, the method may comprise the step of controlling the relative displacement of the image sensor and the object to a position which corresponds to the stored pixel coordinates of a point which is related to a second partial object by using the pixel coordinates of the first partial objects as a reference point. The pixel coordinates of the second partial object can thus be recalculated with the pixel coordinates of the first partial object as origin so that the displacement may continue from the reached position.

Information from the object can be collected in two phases, a first phase comprising scanning a predetermined area by sequentially repeating the recording step, the comparing step and the registering step with relative displacement of the image sensor and the object between repetitions, examining each recorded first image for identification of partial objects of interest, and storing the positions of identified partial objects, and a second phase comprising displacing the image sensor and the object relative to each other so that the positions of the identified partial objects are reached, and recording further images of the partial objects in these positions. An advantage of this method in two phases is that in the first phase a rapid scanning of the object can be made with physical microscope settings which are suited to identify partial objects. In the second phase, it is possible to make new physical microscope settings which are suited for recording high quality images of the partial objects, and return to the partial objects with the new physical microscope settings.

The method may comprise the feature that the position signal is inputted as an actual value signal to a regulation module for regulating the position of a microscope stage in relation to the image sensor.

As mentioned above, the method can be used to regulate the relative positions of the image sensor and the object. However, it may also be used to provide feedback to a user which manually displaces the image sensor and the object in relation to each other, for instance by traditional operation of the microscope stage by means of knobs. The position signal can then be used to give the user instructions about how to move the microscope stage for a predetermined position to be reached or for the entire object to be scanned. An alarm can be given if a partial area of the object is missed in the scanning of the object. The position can also be used to give some other suitable feedback to the user.

The registration of the images can be carried out in many different ways. In one embodiment, the step of comparing image information comprises comparing the image information from the first and the second image for different relative displacements between the images, the first and the second image being registered with the relative displacement which minimises the sum of the squares of the differences between the pixel values of overlapping pixels.

To shorten the time for comparing the image information, this comparison can advantageously be carried out a first time for a first resolution of the images and a second time for a second resolution of the images.

As mentioned above, the images need not be compared in the state in which they are recorded. According to one embodiment of the method, this thus comprises the step of providing the image information from the second image by projecting the pixel values of the second image on an edge line of the second image, at which edge line the second image is to be registered with the first image, the image information from the first image being provided correspondingly.

The projecting can take place, for example, by the pixels being summed up row by row/column by column perpendicular to the edge line.

An advantage of the projecting is that the amount of image information is reduced significantly, without the relevant contents of the image information being lost. Thus the registration of the images can be made with almost the same good result based on the projected images, as when based on the originally recorded images.

If the second image is to be registered with the first image in two orthogonal directions, the second image can also be projected on an edge line which is perpendicular to the previously mentioned edge line.

It has also been found advantageous to calculate a set of covariance values for different relative displacements of the first and the second image parallel with said edge line, and determine an ideal relative displacement of the first and the second image as the relative displacement corresponding to a maximum covariance value in the set.

By using covariance values and projections, the ideal displacement can be determined with limited calculation capacity. The ideal displacement is the displacement that corresponds to the maximum covariance value.

If the registration is made in two orthogonal directions, of course a set of covariance values is also determined for relative displacements along the orthogonal edge line and the ideal displacement is determined by means of the maximum covariance value.

If the recorded images are sequentially registered merely in consideration of their displacement relative to a preceding image, an error may arise relative to images in a direction orthogonally to the direction of registering. For this reason it is advantageous to continually adjust the registration of previously recorded images each time a new image is recorded. If a plurality of images have been recorded earlier and ideal relative displacements have been determined for each pair of images which reproduce a common area of the object, the method may thus further comprise the steps of determining a compromise for the registration of all images so that the total deviation from the ideal relative displacements for all the images is minimised and registering the first and the second image with a relative displacement in accordance with the compromise.

To reduce the calculation work, it has been found advantageous to spatially filter the second image before the comparison with the first image which has then, of course, also been spatially filtered. An example of how spatial filtering can be carried out is disclosed in PCT/SE98/02380. The spatial filtering makes it possible to separate the registration so that it can be carried out for one of two orthogonal directions at a time.

According to a second aspect of the invention, it relates to a microscope comprising an optical system for reproducing an object and an image sensor for recording images of the object reproduced by means of the optical system, and a signal-processing unit for processing the recorded images. The signal-processing unit is adapted to compare image information from a second recorded image, which reproduces a second area of the object, with at least one previously recorded first image, which reproduces a first area of the object, which is partly the same as the second area, to register the second image with the first image, pixels in the second image being assigned coordinates in a pixel coordinate system, in which pixels in the first image have previously been assigned coordinates, and to generate a position signal, which comprises coordinates for a point in the second image.

Advantages of the microscope are evident from that stated above. The further features of the method that have been discussed above can also be implemented in the microscope.

According a third aspect of the invention, it relates to a computer program product which comprises program code for carrying out the method. The computer program product may comprise a storage medium, such as an optical, electronical, magnetical or other kind of storage medium.

BRIEF DESCRIPTION OF THE DRAWINGS

The present invention will now be described by way of example with reference to the accompanying drawings, in which FIG. 1, which has already been discussed above, shows schematically an example of a prior-art microscope.

DESCRIPTION OF AN EMBODIMENT

Composition of the Microscope

Figure 1:
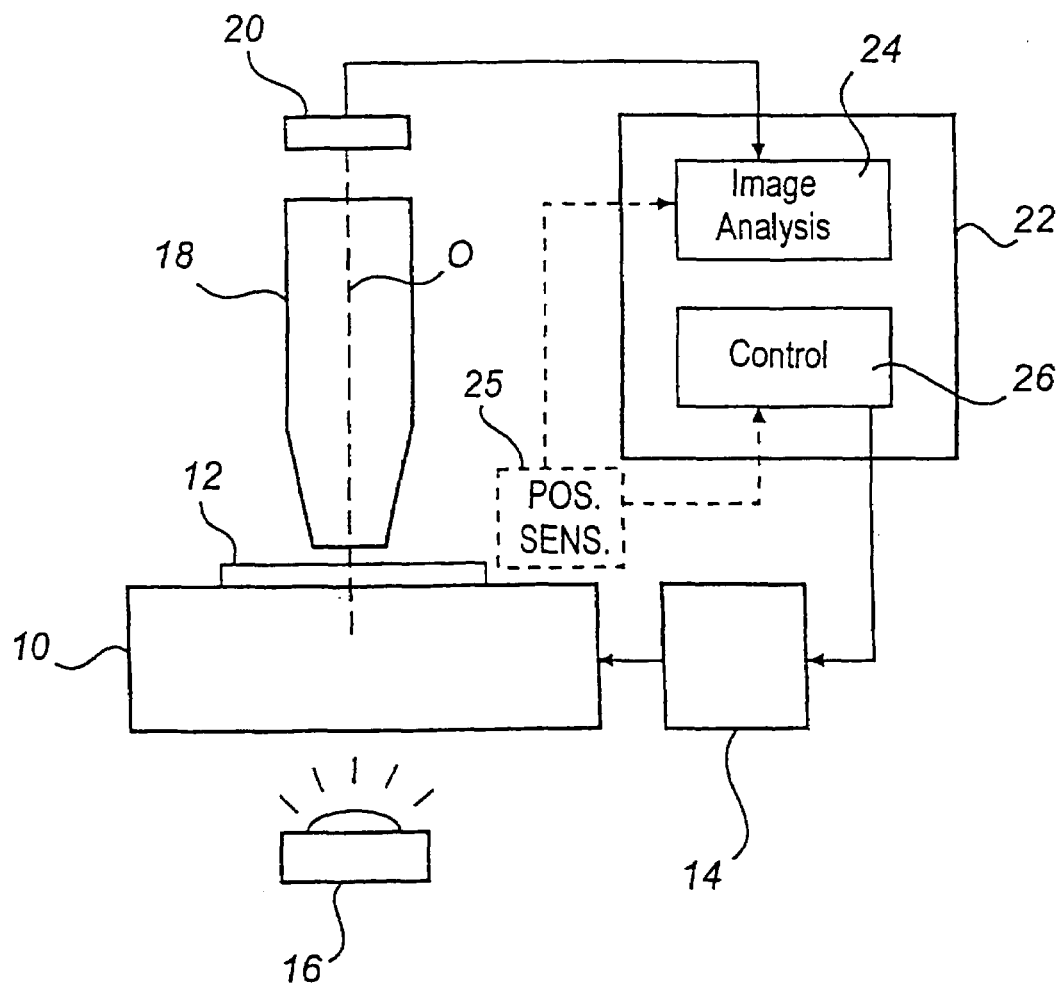
Figure 2:
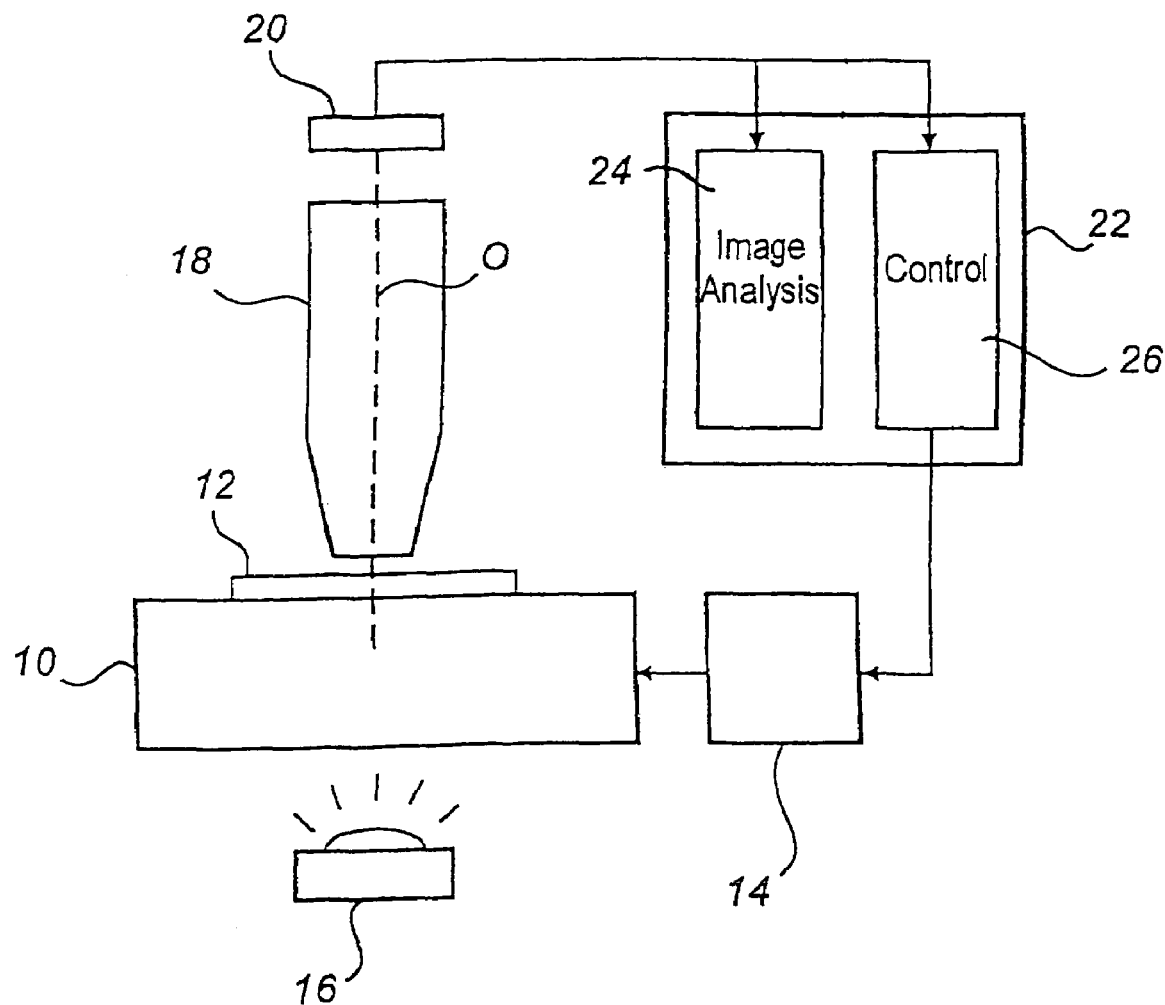
FIG. 2 is a schematic view of an example of a microscope according to the present invention.

FIG. 2 shows schematically an example of a computer-aided microscope according to an embodiment of the invention. For parts corresponding to those in FIG. 1, the same reference numerals have been used as in FIG. 1.

The microscope, which can be, for example, a light field microscope, a dark field microscope or a phase contrast microscope comprises the following main components: a microscope stage 10 for carrying an object 12, a drive mechanism 14 for the microscope stage, an illumination device 16 for illuminating the object, an objective 18 for reproducing the object, an image sensor 20 for recording an image of the object, and a computer 22 for processing and storage of image data and for controlling the drive mechanism. The microscope can also be provided with other components (not shown) which are usually to be found on a microscope, such as an eyepiece, knobs for manual displacement of the microscope stage and components for manual and computer-aided focusing.

The microscope stage 10 is movable in a plane perpendicular to the optical axis O of the objective so that different parts of the object can be reproduced by means of the objective.

The object 12 can be any type of object to be examined in a microscope. It can be a biological object on a slide, such as a tissue sample in which cells are to be identified and examined In an example below, the object is a blood smear, in which white blood cells are to be identified and examined. The object can also be a non-biological object, such as a textile fabrics, in which the fibres are to be examined.

The drive mechanism 14 can in its very simplest form comprise one or more geared DC motors which drive by means of rubber rolls directly on the movable parts of the microscope stage. Alternatively, it may comprise a screw mechanism, not completely without play, which is driven by a motor. The drive mechanism can also be accomplished with other components which to different extents have no repeatability or accuracy. It is evident that it can also be accomplished with components with high repeatability and accuracy.

The image sensor 20 is an area sensor. It may be a CCD sensor or a CMOS sensor or some other sensor which is suitable for recording microscope images.

The computer 22 can be an ordinary personal computer with a display and input devices in the form of a mouse and a keyboard.

In addition to the software that is available in a computer to handle its normal functions, the computer in FIG. 2 is provided with a control program module 26 for controlling the movement of the microscope stage via the drive mechanism and an image analysing program module 24 for analysing images recorded by the image sensor. It should be emphasised that the division into control program module and image analysing program module is made merely for the sake of clarity. In practice, it can be one and the same program module or more than two program modules which carry out the corresponding functions. This is symbolised by the double arrow between boxes 24 and 26 in FIG. 2.

The computer can also be provided with other software for controlling the microscope, for instance software for autofocusing, and other software for analysing the contents of the final images which are useful for the application and which are recorded. However, such software will not be described in this specification since it is not relevant to the present invention.

The above described hardware components can be of a conventional type, i.e. of the same type as is currently used in computer-aided microscopes.

Function of the Microscope

The function of the microscope in FIG. 2 will now be described with reference to the flow chart in FIG. 3. The description is made with emphasis on how the microscope stage is controlled in microscopy for collecting information from the object.

In this example, it is assumed that the object is a blood smear on a slide. The collecting of information from the object comprises finding partial objects in the form of white blood cells and recording high quality images of these to enable classification of the blood cells based on the images.

The collecting of information is carried out in this embodiment in two phases. In a first phase, the entire object, or a predetermined part thereof, is scanned relatively quickly for locating white blood cells and storing the positions thereof. In a second phase, the white blood cells are sought out once more and reproduced with settings of the microscope which result in high quality images.

One reason for making the examination in two phases can be the following. In the specification of the imaging system there is a built-in inconsistency in the condition that one wants to be able to scan large object areas rapidly and take high quality high-resolution images of partial objects. Several settings of the microscope, such as the choice of objective, the selection of having. immersion oil or not, the selection of contrast principle, the selection of focus position, intensity and spectrum of the illumination and the choice of optical filters, in most cases have one optimum value for rapid and reliable discovery of the partial objects, but one or more completely different values for providing high quality analysable images of the partial objects. In most cases it takes time to change these physical settings. Therefore it can totally seen be quicker first to locate all partial objects and then change settings with the aid of adjusting means and finally again find the partial objects. Cost-savings are also possible since it is then possible to use, for instance, simpler, slower adjusting means, e.g. objective adjusting means, which may besides have a shorter service life as to the number of settings.

Figure 3:
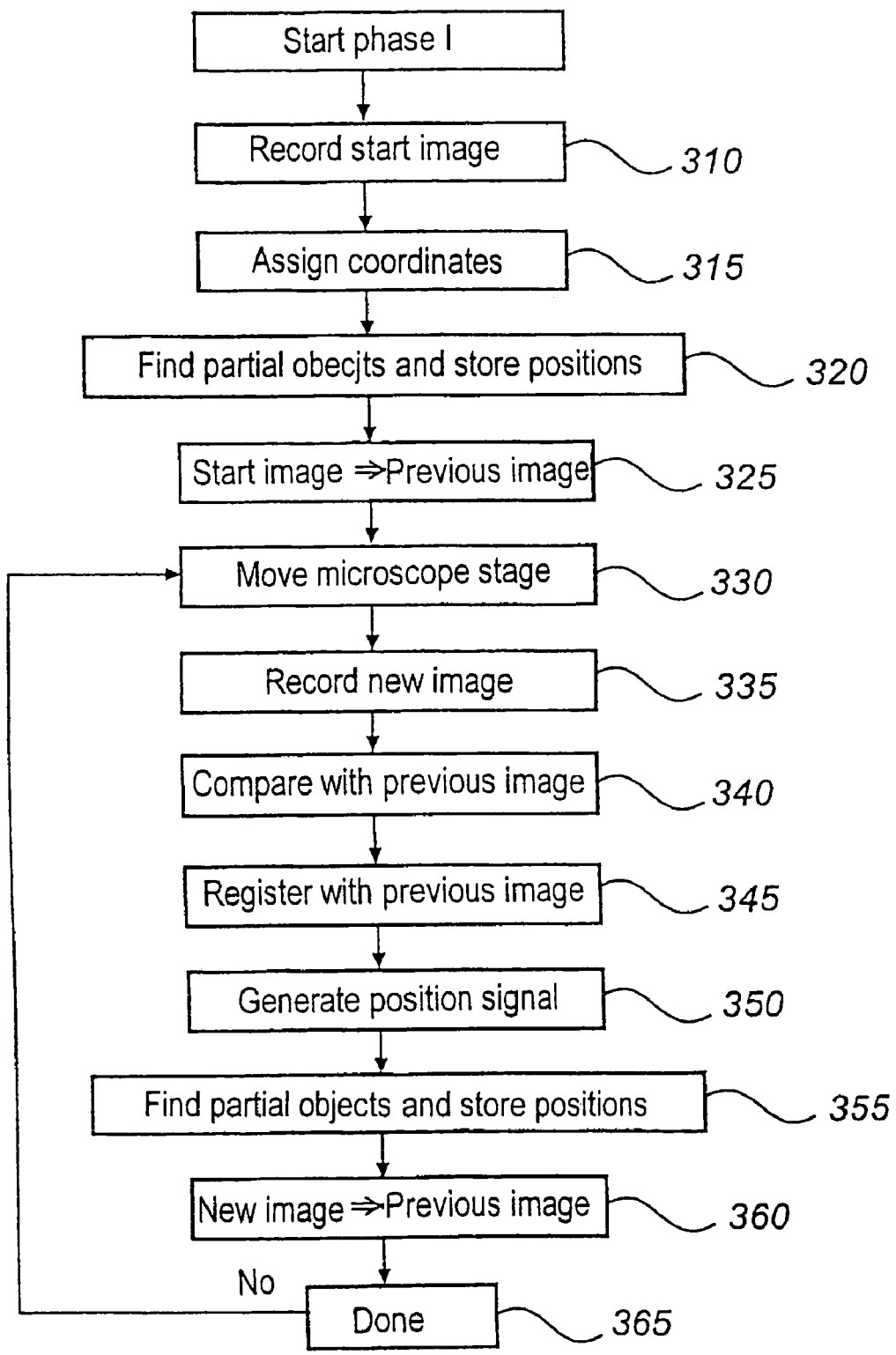
FIG. 3 is a flow chart describing a first phase of collecting information from an object according to an embodiment of the present invention.
Figure 4:
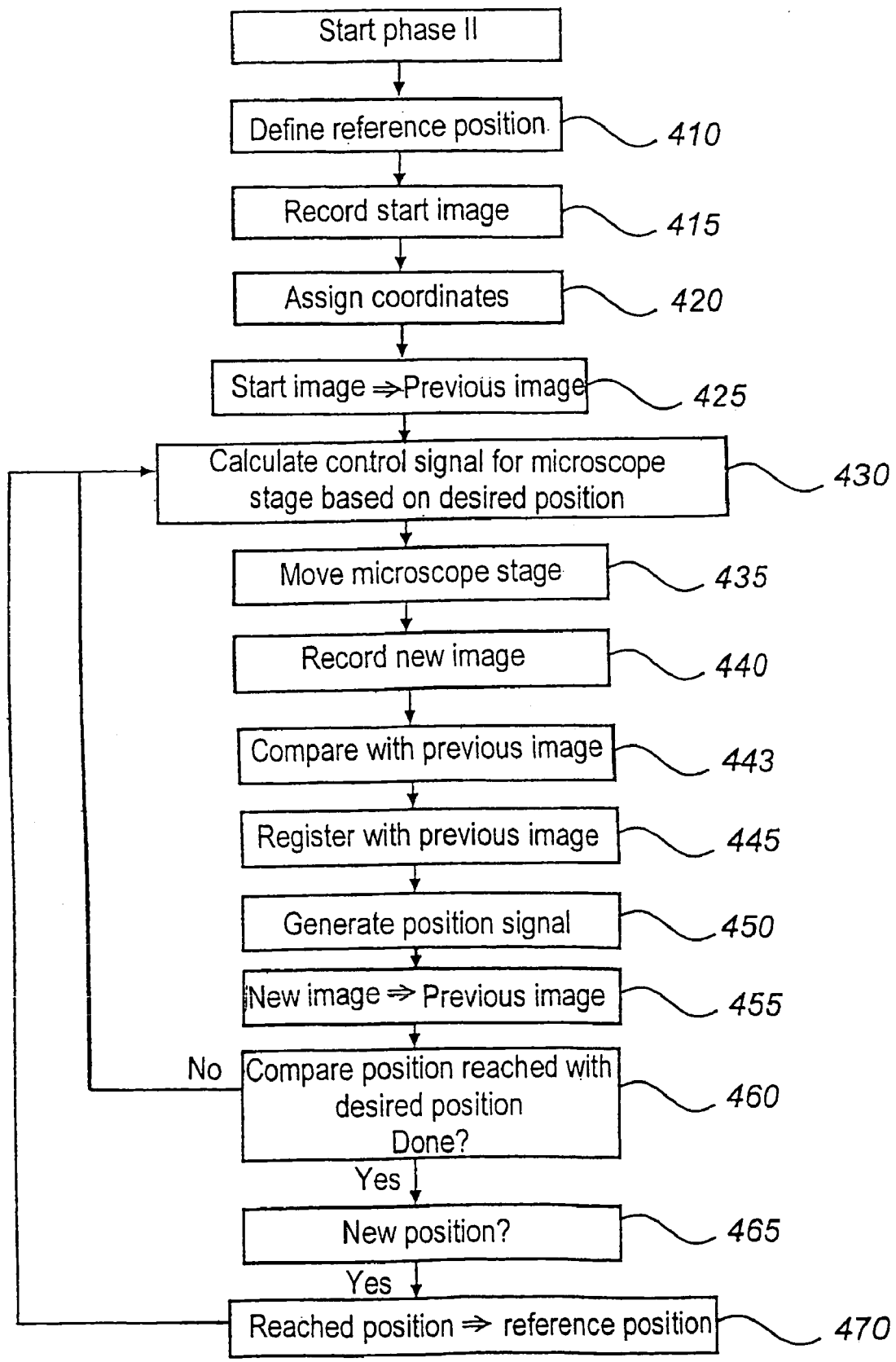
FIG. 4 is a flow chart describing a second phase of collecting information from an object according to an embodiment of the present invention.

In the first phase, the control program module first controls the drive mechanism 14 to position the micro-scope stage 10 in a starting position, in which a start image is recorded by the image sensor 20, step 310 in FIG. 3. The start image reproduces a first area of the object. The image is transferred to the image-analysing module 24 of the computer 22 and to its control module 26.

In the control module, the pixels of the start image are assigned coordinates in a pixel coordinate system, step 315. If the scanning of the object begins in the upper left corner of the object, the pixel corresponding to the upper left corner can, for instance, be assigned the pixel coordinates 0,0. Since the size of the image in number of pixels is known, the other pixels are automatically assigned coordinates.

In the image-analysing module, any white blood cells in the start image are identified and the pixel coordinates for these are stored in a memory in the computer or in a memory which is available to the computer, step 320. Subsequently the processing of the start image is terminated and this image will now serve as a previous image, and is therefore saved as a previous image, step 325.

Then the control program module 26 commands the drive mechanism 14 to move the microscope stage 10 to a new position in relation to the objective, step 330. The new position should be such that the objective generates an image of a second area of the object, which second area overlaps the first area to the desired extent.

The new image generated by the objective is recorded by the image sensor 20, step 335, and transferred to the computer 22 in the same way as the start image. In the computer 22, image information from the new image is compared with image information from the previous image, step 340. On the basis of the result, the new image is registered with the previous image, step 345. The registration, which will be described in more detail below, means in general that the overlapping contents of the images are registered so that the best match between the contents of the images -is achieved. In other words, the images are registered in correspondence with the over-lapping of the areas. In this connection, the pixels in the second image, i.e. the new image, are assigned coordinates in the pixel coordinate system, in which the first image, i.e. the previous image, has already been assigned coordinates. It can be seen as if the second image is put into the same coordinate system in the position where it best matches the first image. Since the size of the image is known, the position of the second image in the image coordinate system can be defined, for example, with two coordinate pairs for the diagonally opposite corner points. If the registration is of the type that a recorded image is registered merely with the preceding image, the previous image can now be deleted.

Then a position signal is generated, step 350, which comprises the coordinates of a predetermined point in the second image. The predetermined point can be any point in the image, e.g. the pixel in the uppermost left corner. The position signal is used by the control module to control the displacement of the microscope stage, as will be described in more detail below.

Like in the case of the start image, the image is analysed further to identify any white blood cells and store the pixel coordinates of these, step 355. The pixel coordinates of a white blood cell can easily be calculated by starting from e.g. the pixel coordinates of the predetermined point and adding the number of pixels in the horizontal and vertical direction from the predetermined point to the white blood cell.

The processing of the second image is terminated by storing it as a previous image, step 360.

Finally, the control software checks whether the scanning of the object is completed, step 365. If this is not the case, the control software returns to step 330, and steps 330-365 are repeated until the object has been scanned.

Figure 5:
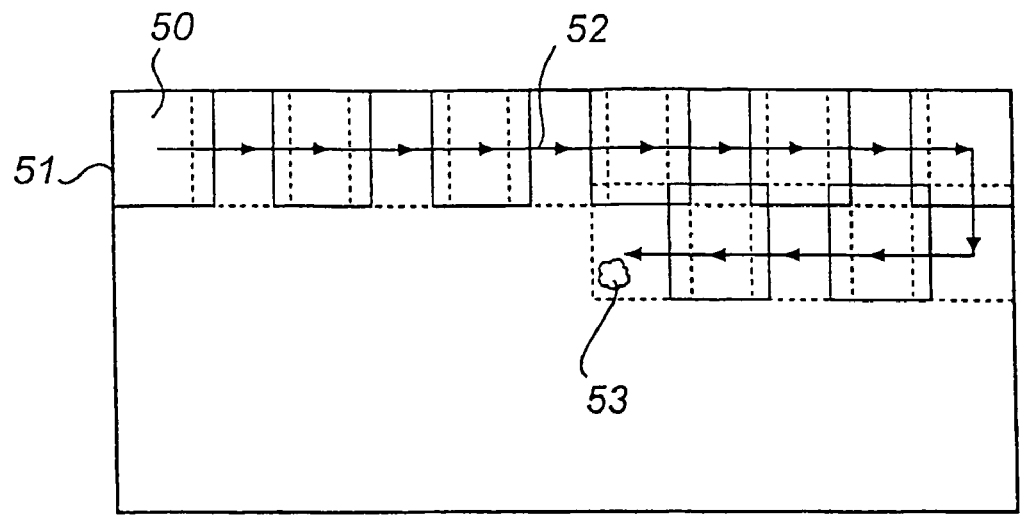
FIG. 5 shows schematically how images can be recorded in the first phase of the collecting of information according to an embodiment of the present invention.

The displacements of the microscope stage usually take place according to a predetermined pattern. An example is shown in FIG. 5. The displacements in this example take place in such manner that the images are recorded with overlap in rows on the object 51. For the overlap to be seen more distinctly, every second image is shown with full lines and every second with dashed lines. Arrows 52 illustrate the direction of displacement. When the end of a row has been reached, the microscope stage is moved so that the images can be recorded from the next row. The displacement along this row is made most easily in the direction opposite to the displacement along the first row. In the last recorded image, a partial object 53 has been marked.

When the first phase has been terminated and thus the positions of the identified white blood cells have been determined and stored in a list, the physical settings of the microscope are changed and then the second phase is begun. The purpose of the second phase is to record high quality images of the white blood cells in the list. This can e.g. imply that images need be recorded with a magnification other than that used in the first phase. This means in turn that the pixel coordinates will have a different meaning. To take care of this, the pixel coordinates can be recalculated with regard to the magnification. The recalculation can be carried out, for instance, in such manner that the positions are expressed as distances in terms of micrometers from a reference point.

The control of the microscope stage is made in essentially the same manner during the second phase as during the first phase. However, there is an important difference. The displacement of the microscope stage is normally not made according to a predetermined pattern. Instead, the control program module 26 tries to move the microscope stage along the shortest path between two white blood cells so that as few overlapping images as possible need be recorded for the position determination.

To this end, the control program module can, before the displacements during the second phase have begun, examine the list of the positions of the white blood cells and re-sort them so that the displacements of the microscope stage are optimised.

As an actual first step of the second phase, a reference position for the microscope stage is defined, step 410. The reference position can suitably be the position in which the scanning during the first phase was terminated and in which the microscope stage is already located. It can also be some other predetermined position to which the microscope stage is moved. In this example, the lower right corner of the object is used as the reference position.

In the reference position, a start image is recorded, step 415, and the start image is assigned coordinates, step 420, in the corresponding way as during the first phase. The start image is saved as a previously recorded image, step 425. As an alternative to steps 415-425, the last recorded image during the first phase can be used.

The microscope stage is now to be moved so that the first white blood cell in the list can be reproduced. Now assume that it is located in position x1, y1. The control program module 26 then determines control signals for the drive mechanism 14 to move the microscope stage 10 towards this position along the shortest path, step 430. This path need not coincide with the one that was followed in the first phase, not even if the reference position in the second phase is the same as the starting position in the first phase.

First, the microscope is moved a distance towards the desired position, step 435. In the same way as during the first phase, a new image is recorded, step 440, which is compared and registered with the previous image, steps 443 and 445. A position signal which consists of the pixel coordinates of the predetermined point is generated, step 450. The processing of the image is now terminated and the image is saved as a previously recorded image, step 455. Based on the position signal, it is determined whether the position reached is the desired position, step 460. If this is not the case, the control program module returns to step 430, determines new control signals and moves the microscope stage further towards the desired position.

During the entire displacement, images are thus recorded and the position is checked based on the pixel coordinates in the position signal. The position signal is used both to check that the desired position has been reached and to ensure that the overlap between successively recorded images will be the desired one so that the displacement can be made as rapidly as possible with-out missing an area of the object.

When the desired position has been reached, a high quality image of the white blood cell is recorded and stored. Subsequently the control software 26 checks whether there are further white blood cells to be reproduced, step 465. If this is the case, the reached position of the just reproduced white blood cell can be used as the reference position for the next displacement, step 470. Then the control program module returns to step 430 and calculates new control signals for the displacement to the next position based on the difference between the coordinates of the next position and the coordinates of the reference point.

The method is repeated until the desired blood cells have been reproduced.

Figure 6:
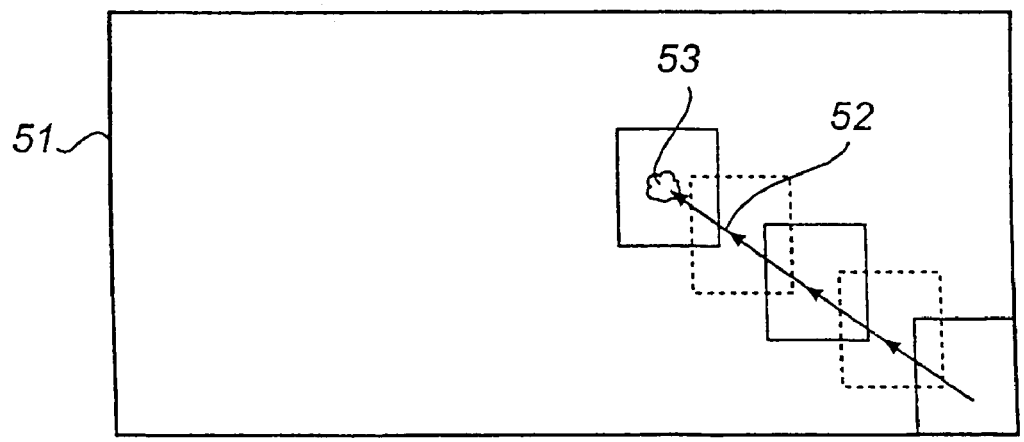
FIG. 6 shows schematically how images can be recorded when displaced to a desired position according to an embodiment of the present invention.

FIG. 6 shows schematically how the displacement takes place during the second phase. It is here assumed that the displacement during the second phase begins in the lower right corner. The displacement is to be made in such manner that the partial object 53, which is also to be found in FIG. 5, can be reproduced. During displacement, images 50 with partly overlapping contents are recorded. The displacement takes place along the shortest path to the position of the partial object 53.

Position Control and Regulation

As mentioned above, the drive mechanism can be extremely simple and consist of, for instance, one or more geared DC motors which drive with one or more rubber rolls directly on the movable part/parts of the microscope stage. Such a drive mechanism is usually not in itself repeatable. The same control signals to the DC motors will thus result in different displacements of the microscope stage. This means that the overlap between successively recorded images will vary, which may result in a suboptimal scanning rate or a risk of failure to overlap. Moreover it will be difficult to reach exactly the desired position of the high quality reproduction of the partial objects in the second phase.

By utilising the position signal from the registration of images, it is however possible to provide a feed-back system which is repeatable.

The position signal can be used in different ways. It may be fed as an actual value signal to a regulation loop which controls the position of the microscope stage. It can also form the basis of speed regulation. The instantaneous speed of the displacement between two recordings of images can be determined based on the usually constant and known time between these two recordings of images and the distance, determined in pixels, between two recordings of images.

The position signal can also be used for correction of positions. In this case, the microscope stage is first moved. Then the reached position is checked. If it deviates more than by a predetermined value from the desired position, a correction is made towards the desired position.

The position signal can also be used to check that no part of the object is missed in the scanning.

The position signal can also be used to ensure that the overlap between successively recorded images will be the desired one. When a recorded image has been registered with a previous image, it is checked what overlap was obtained and the obtained overlap is compared with the desired overlap. The drive mechanism is then controlled based on the deviation between the obtained overlap and the desired overlap.

Techniques of Registration

The registration of images can be carried out in different ways. In a first embodiment, the last recorded image, image i, is all the time registered with the last but one recorded image, image i–1. This form of registration is referred to as local registration.

An advantage of local registration is that is quick and requires a relatively small amount of memory since the last but one recorded image can be deleted as soon as the registration with the last image has been carried out.

As an alternative to local registration, what is referred to as global registration can be carried out. This means that the last image, image i, is registered with essentially all previous images, image 1, 2, . . . i–1.

An advantage of global registration is that the registration errors and, thus, the position errors may be smaller. Another advantage is that global registration may better cope with "white spots", i.e. areas of the object which provide a small amount of registration information, or none at all.

It goes without saying that the registration can also be made involving something between pure local and pure global registration, i.e. registration of the last image with a plurality, but not all, previous images.

The actual registration means that it is determined how the images overlap, thus obtaining a registered or composite image which, as well as possible, without redundancy, reproduces the area that the recorded images reproduce totally.

The registration can also be made directly with the images in the condition in which they are recorded by the image sensor or with different processed versions of the images, or merely with the aid of certain information that has been extracted from the images. In all cases, image information from the recorded images is thus utilised.

How the images are to be registered is determined by comparing the images in a plurality of different relative positions, i.e. in positions with different degrees of overlap, i.e. relative displacement. The comparison can be carried out in different ways. As a very simple example, each pair of overlapping pixels can be given a score which is higher the more equal the pixel values (intensities of the pixels). The overlapping position which has the highest total score is selected.

Figure 7:
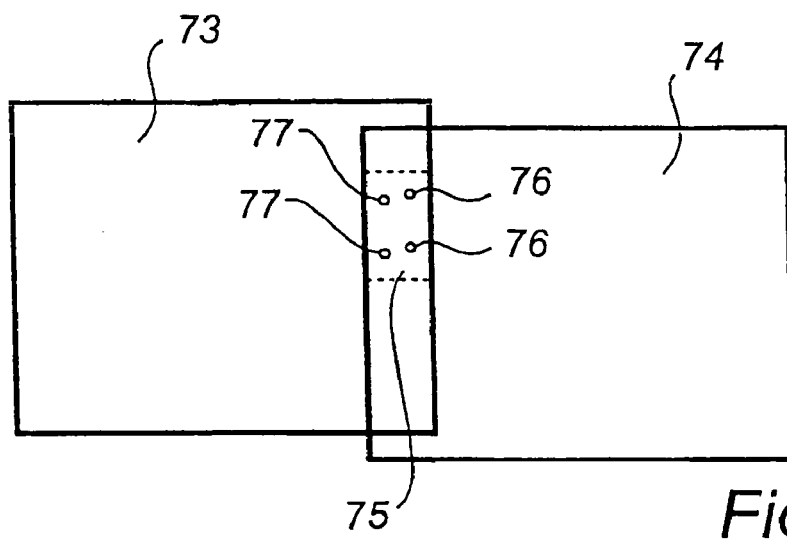
FIG. 7 shows schematically how two images can be registered according to an embodiment of the present invention.

Now follows a description with reference to FIG. 7 of a different way of registering two images 73 and 74 which have been recorded with a certain overlap. The control program module 26 selects an area 75 with great occurrence of high spatial frequencies and high contrast. In the area 75 there are structures that are to be found in both images, such as the structures 76 in the image 73 and the structures 77 in the image 74. The resolution in the images 73, 74 is electronically reduced by factor 8 so that the number of pixels in the images is reduced by factor 64. Image 74 is then moved in relation to image 73 so that the sum of squares of the intensity differences of overlapping pixels in the area 75 is minimised. The square sum of the differences is in most cases minimal when image 74 has been moved so that the structures 76 have the same position as the structures 77. Subsequently the minimising is repeated for successively increasing resolution, the obtained relative position being used as the starting position for the next minimising step. The resolution is increased by a factor 2 in each minimising step until the maximum resolution has been reached. As a result, the images are placed gradually closer to their correct relative position. In each minimising step, the images are moved to different positions which represent a combination of orthogonal displacements from the starting position. Image 73 is composed of a number of pixels which are each associated with a value describing the intensity of the pixel. In the case where the image 73 is a colour image it is associated with three different colours: red, green and blue, which each have a value describing the intensity of precisely that colour in the pixel. If the images are colour images, the comparison is made in the area 75 for one or more of the colours. The colour images can also be converted into grey scale images and the comparison can be made between the grey scale images.

In the following an embodiment of the global registration will be described. In this embodiment, the registration is carried out in two steps. In the first step, the optimal registration is determined for each pair of images overlapping each other. In the second step, a global compromise is determined for all such pairs of images so that the registration will be as good as possible globally seen. In this embodiment the images are assumed to cover a rectangular object surface.

In the first step, the images of a pair of images are projected first each separately on each of two orthogonal directions in the images. More specifically, the pixel values in the rows and the columns respectively are summed up, after which the row sums and the column sums are spatially filtered. Then sample covariances (in the following referred to merely as covariances) are calculated for different relative displacements of the images in the usual manner except that one does not divide by the number of measuring points. The reason for this that it is desirable to give increased preference to displacements for which a larger number of measuring points correspond to each other. For each of the pairs of images, thus two sets of covariances are obtained as functions of the displacements—one for each of the orthogonal directions. The maximum for each such set is determined. This maximum and its two adjoining points are used to form a second degree curve from which an estimate of the optimal registration at subpixel level is carried out. This estimate is then used as a base for the optimisation which is carried out in the second step of the global registration; In the first step, also weights W are calculated, one for each of the orthogonal directions, which describe how much inferior each registration in pairs would be for each unit of length displaced away from the optimal registration. These weights will depend on the degree of distinctness and information abundance in each overlap. The weights W are given by:

$$W = 1 - \sum_i \left( \frac{S(i) - 0.25 * \max(S)}{0.75 * \max(S)} \right)^2 - \sum_j \left( \frac{S(j) - 0.50 * \max(S)}{0.50 * \max(S)} \right)^2$$

where $i \epsilon [S(i) \geq 0.25 \max(S), |i - \max| > 2] j \epsilon [S(j) \geq 0.50 \max(S), |j - \max| = 2 ]$, where S(i) is the covariance in the displacement i, and S(max)=max(S). If W is negative, the fitting is considered unusable and W is set to be zero.

After optimal registrations of all pairs of images have been calculated, there remains to find the globally best adaptation to these. This is carried out in the second step of the global registration. More specifically, a global compromise is calculated by a globally weighted least square problem being set where the unknowns are precisely how much the relative positions are to be displaced in the optimal registrations in pairs. What is minimised is a loss function which is expressed in the displacements and where the weights above determine how much it "costs" to make displacements in each pair. Also the global compromise is optimised first in one of the direction of the columns and the direction of the rows and then in the other direction. That this is possible depends on the separating effect of the spatial filtering. The loss function E is in both optimisations:

$$E = \sum_{l=0}^{m-1} \sum_{k=0}^{n-2} W_{l,k,0}(C_{l,k,0} - (X_{l,k} - X_{l,k+1}))^2 + \sum_{l=0}^{m-2} \sum_{k=0}^{n-1} W_{l,k,1}(C_{l,k,1} - (X_{l,k} - X_{l+1,k}))^2,$$

where m is the number of rows of images in a column, n is the number of images in a row, $C_{l,k,0}$ is optimal registration between image [l,k] and its neighbour to the right and $C_{l,k,1}$ is optimal registration between image [l,k] and its lower neighbour. $W_{l,k,0}$ and $W_{l,k,1}$ are correspondingly the weight of each registration in pairs. $X_{l,k}$ is the displacement of the image either in x direction or in y direction dependent on which optimisation has been carried out. The equation system has no unambiguous solution, which is remedied by x and y for one of the images included needing to be determined as a boundary value This form of registration is well suited to be used in scanning of objects and position determination according to the invention. When a new image is recorded, it is sufficient to register the image with the image or images which it overlaps, so that the ideal registration is determined, and to determine the corresponding weights W. For this to be carried out, it is sufficient for the sums of rows and columns to be saved for the previously recorded images with which the new image is to be registered.

Subsequently, the global compromise can be carried out with regard to the new image. For this step, it is sufficient that the weights W and the optimal registrations C for the previously recorded images remain.

Alternative Embodiments

Various embodiments of the invention have been described above. These can be modified, varied and combined in different ways.

Instead of the microscope stage being displaceable, the objective and the image sensor can be movable and the microscope stage can be stationary. The important thing is that a relative displacement can be carried out so that the object can be scanned.

Instead of the illumination device being arranged for transmission, it can be arranged for reflection.

The objective can be replaced by some other convenient type of optical system, such as a single lens.

The computer can wholly or partly be replaced by some other kind of processing unit, for example specially adapted hardware, such as an ASIC (Application Specific Integrated Circuit) or an FPGA (Field Programmable Gate Array).

It has been described above how the scanning of the object is carried out automatically under the control of the control module of the computer. However, the scanning can also be carried out manually by means of the knobs for manual control of the microscope stage. The position signal is then used to check that the user carries out the scanning in the predetermined manner. If, for instance, the user should return to a previously stored position, for instance in order to manually examine a partial object, the user can obtain instructions via the display of the computer about how the microscope stage is to be moved. If the microscope stage is then moved in the incorrect direction, an alarm can be given, for instance visually or audibly. Another kind of feedback can be given when the user moves the microscope stage correctly.

It has been assumed above that the microscope stage has no rotational disturbances. However, such disturbances can also be handled provided that an extended registration as described in PCT/SE98/02380 is used.

It has also been described above that collecting of information from the object can be carried out in two phases. However, it can also be made in a single phase. This embodiment is particularly convenient when the recording of images of partial objects of the object requires no change of physical microscope settings.

The invention claimed is:

1. A method in microscopy for generating a position signal, comprising the steps of:
   recording at least one first image;
   recording, by means of an image sensor, a second image which reproduces a second area of an object,
   comparing image information from the second recorded image with image information from the at least one previously recorded first image, which reproduces a first area of the object, which partly overlaps the second area,
   registering the second image with the first image on the basis of the result of the comparison, pixels in the second image being assigned coordinates in a pixel coordinate system, in which pixels in the first image have previously been assigned coordinates, and
   generating a position signal, which comprises coordinates of a point in the second image, wherein the position signal is used to indicate the relative position of the image sensor and the object when recording the second image.

2. A method as claimed in claim 1, wherein the position signal is used to indicate the position of a partial object in the second image.

3. A method as claimed in claim 1, further comprising the steps of sequentially repeating the recording step, the comparing step and the registering step a desired number of times with relative displacement of the image sensor and the object between repetitions.

4. A method as claimed in claim 3, wherein the recording step, the comparing step and the registering step are repeated until a predetermined area of the object has been scanned.

5. A method as claimed in claim 4, wherein the step of generating the position signal is performed once each time the recording step is performed.

6. A method as claimed in claim 3, wherein the recording step, the comparing step and the registering step are repeated until a predetermined relative position of the image sensor and the object has been reached.

7. A method as claimed in claim 6, wherein the step of generating the position signal is performed once each time the recording step is performed.

8. A method as claimed in claim 3, wherein the step of generating the position signal is performed once each time the recording step is performed.

9. A method as claimed in claim 3, further comprising the step of controlling, by means of the position signal, the relative displacement of the object and the image sensor between repetitions of the recording step.

10. A method as claimed in claim 3, further comprising the step of correcting the relative position of the object and image sensor by means of the position signal.

11. A method as claimed in claim 3, further comprising the steps of looking in the image, for each recorded second image, for partial objects of interest and, when a partial object of interest has been identified, storing the pixel coordinates of a point which is related to the partial object.

12. A method as claimed in claim 11, further comprising the step of controlling the relative displacement of the image sensor and the object to a position which corresponds to the stored pixel coordinates of a point which is related to a first partial object by, starting from a reference position, controlling the displacement on the basis of the pixel coordinates, and by repeating, during the displacement, the recording step, the comparing step, the registering step and the generation of the position signal and by comparing the position signal with the pixel coordinates.

13. A method as claimed in claim 12, further comprising the step of controlling the relative displacement of the image sensor and the object to a position which corresponds to the stored pixel coordinates of a point which is related to a second partial object by using the pixel coordinates for the first partial object as a reference point.

14. A method as claimed in claim 1, wherein information from the object is collected in two phases, a first phase comprising scanning a predetermined area by sequentially repeating the recording step, the comparing step and the registering step with relative displacement of the image sensor and the object between repetitions, examining each recorded first image for identification of partial objects of interest, and storing the positions of identified partial objects, and a second phase comprising displacing the image sensor and the object relative to each other so that the positions of the identified partial objects are reached, and reproducing the partial objects in these positions.

15. A method as claimed in claim 1, wherein the position signal is inputted as an actual value signal to a control unit for controlling the position of a microscope stage in relation to the image sensor.

16. A method as claimed in claim 1, wherein the method is carried out during manual relative displacement of the image sensor and the object.

17. A method as claimed in claim 1, wherein the step of comparing image information comprises comparing the image information from the first and the second image for different relative displacements between the images, the first and the second image being registered with the relative displacement which minimises the sum of the squares of the differences between the pixel values for overlapping pixels.

18. A method as claimed in claim 17, wherein the comparison of the image information is carried out a first time for a first resolution of the images and a second time for a second resolution of the images.

19. A method as claimed in claim 17, further comprising the step of spatially filtering the second image.

20. A method as claimed in claim 1, further comprising the step of providing the image information from the second image by projecting the pixel values of the second image on an edge line of the second image, at which edge line the second image is to be registered with the first image, the image information from the first image being provided correspondingly.

21. A method as claimed in claim 20, further comprising the step of calculating a set of covariance values for different relative displacements of the first and the second image parallel with said edge line, and determining an ideal relative displacement of the first and the second image as the relative displacement that corresponds to a maximum covariance value in the set.

22. A method as claimed in claim 21, wherein a plurality of images have been recorded previously and wherein ideal relative displacements have been determined for each pair of images which reproduce a common area of the object, further comprising the step of determining a compromise for the registration of all images so that the total deviation from the ideal relative displacements of all the images is minimised, and registering the first and the second image with a relative displacement in accordance with the compromise.

23. A microscope which can generate a position signal comprising:
   an optical system for reproducing an object;
   an image sensor for recording at least first and second images of the object reproduced by means of the optical system; and
   a signal-processing unit for processing the recorded images, wherein the signal-processing unit is adapted to compare image information from the second recorded image, which reproduces a second area of the object, with at least one previously recorded first image, which reproduces a first area of the object, which partly overlaps the second area, register the second image with the first image, pixels in the second image being assigned coordinates in a pixel coordinate system, in which pixels in the first image have previously been assigned coordinates, and generate a position signal, which comprises coordinates of a point in the second image, wherein the position signal is used to indicate the relative position of the image sensor and the obiect when recording the second image.

24. A microscope as claimed in claim 23, further comprising a microscope stage for carrying the object, the position signal being used to control the displacement of the microscope stage.

25. A computer readable medium storing a computer program for generating a position signal comprising program code which, during execution in a computer, is adapted to record a first recorded microscope image, compare image information from a second recorded microscope image, which reproduces a second area of a microscope object, with at least one previously recorded first microscope image, which reproduces a first area of the microscope object, which partly overlaps the second area, register the second microscope image with the first image, pixels in the second microscope image being assigned coordinates in a pixel coordinate system, in which pixels in the first microscope image have previously been assigned coordinates, and generate a position signal, which comprises coordinates of a point in the second microscope image, wherein the position signal is used to indicate the relative position of the image sensor and the obiect when recording the second image.

* * * * *